Sept. 26, 1933.   J. DUBROVIN   1,928,096
GAUGE FOR SUBATMOSPHERIC PRESSURES
Filed Sept. 21, 1932   2 Sheets-Sheet 1
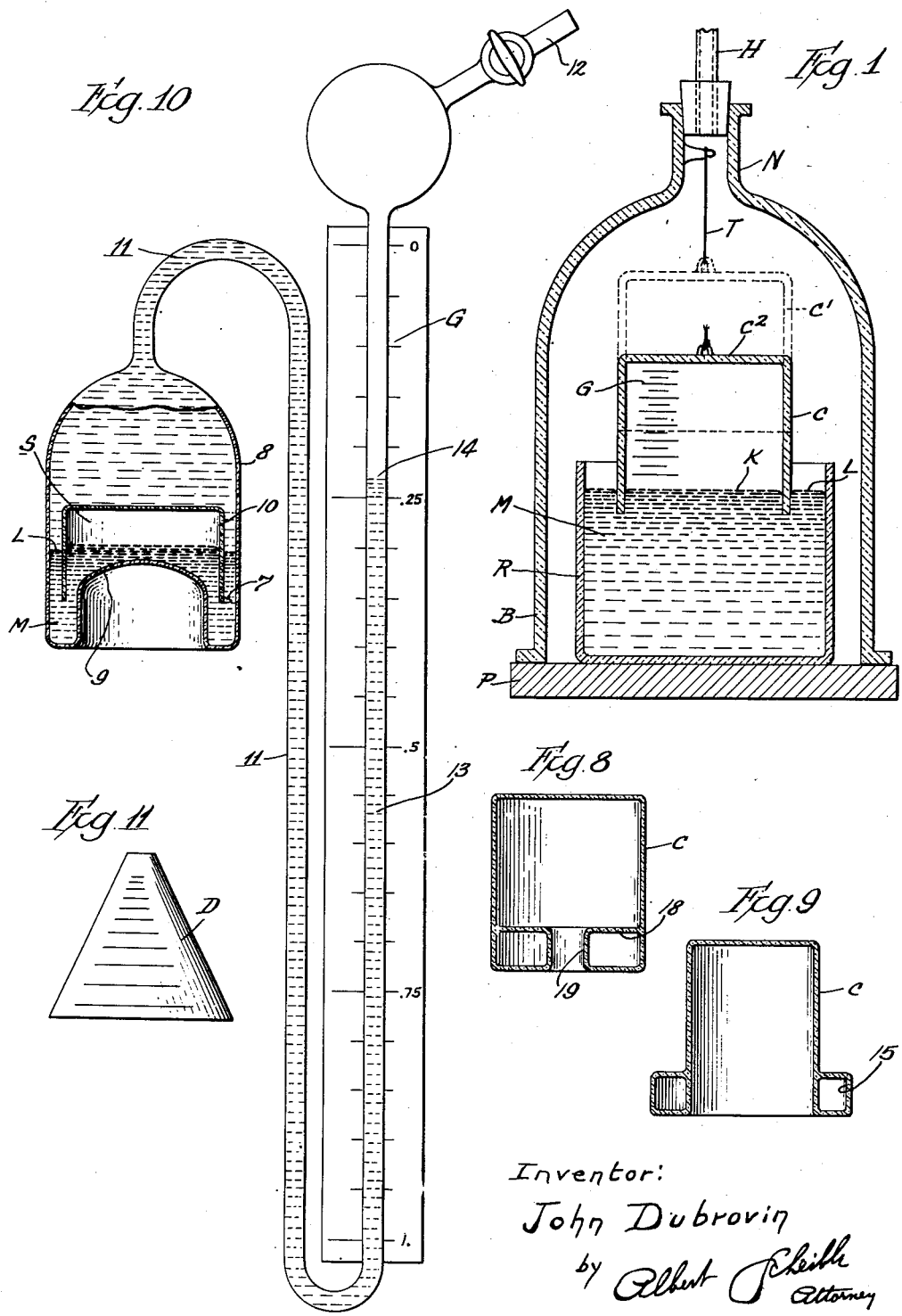
Inventor:
John Dubrovin
by Albert Scheible
Attorney Sept. 26, 1933.  J. DUBROVIN  1,928,096
GAUGE FOR SUBATMOSPHERIC PRESSURES
Filed Sept. 21, 1932   2 Sheets-Sheet 2
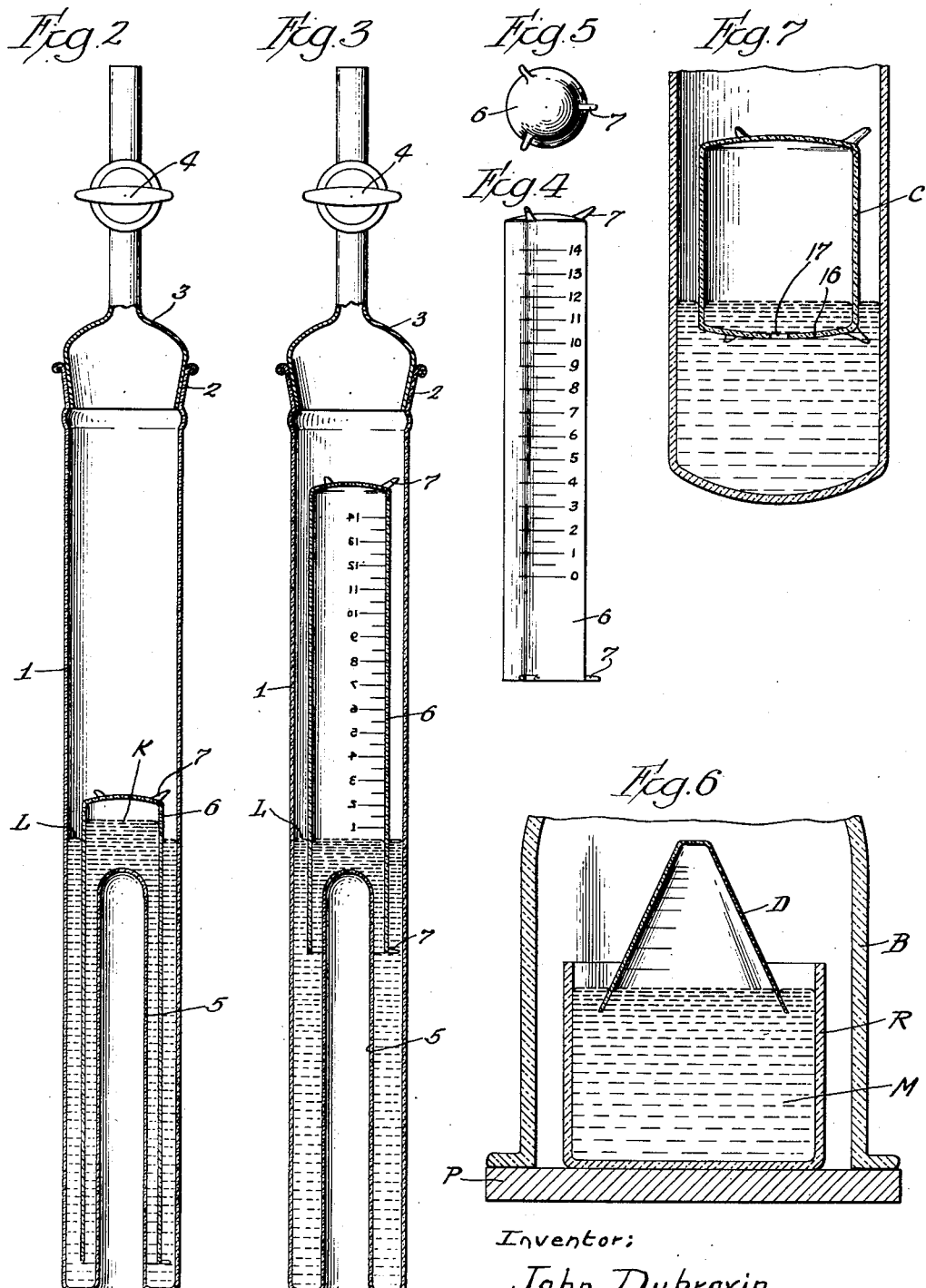
Inventor;
John Dubrovin
by Albert Scheib
Attorney Patented Sept. 26, 1933

1,928,096

UNITED STATES PATENT OFFICE 1,928,096

GAUGE FOR SUBATMOSPHERIC PRESSURES

John Dubrovin, Chicago, Ill.

Application September 21, 1932
Serial No. 634,206

14 Claims. (Cl. 73—31)

My invention relates to so-called vacuum gauges for indicating the pressure of gases at less than atmospheric pressure.

Generally speaking, the objects of my invention are those of providing a simple and inexpensive gauge of this class which will speedily respond to variations in pressure, which can easily be connected to the gas container, and which will present its reading on a scale having widely spaced markings, even when the space between consecutive markings corresponds to only a small fraction of a millimeter in the height of a barometric column of liquid. In addition, my invention aims to provide a gauge of this type which will afford such minutely varying indications without requiring the use of any magnifying glass or other instrument for the reading; and also aims to provide a gauge which will not require a scale of prohibitive length for this purpose and one which can easily be calibrated.

More particularly, my invention relates to a gauge for low gas pressures in which the indications are responsive to the extent to which an inverted cup-like member is immersed in a liquid subject to the gas which is to be measured as to its pressure, namely a gauge in which the indication varies (according the pressure above the liquid) with the height at which such a freely floating inverted cup establishes its equilibrium. Furthermore, my invention aims to provide simple means for increasing the extent to which such a cup moves in response to gas pressure variations, for magnifying the spacing of the corresponding indications, and for reducing the needed quantity of liquid.

Still further and also more detailed objects will appear from the following specification and from the accompanying drawings, in which drawings Fig. 1 is a central and vertical section through a simple gauge embodying my invention.

Fig. 2 is a central and vertical section through an embodiment of my invention in which the lower portion of the receptacle is formed for reducing the needed amount of liquid, showing the position of the cup when the gas above the liquid is at approximately atmospheric pressure.

Fig. 3 is a section similar to Fig. 2, taken when the gas above the liquid is at zero pounds pressure.

Fig. 4 is an elevation of the inverted cup, taken from the side provided with the indicating graduations.

Fig. 5 is a plan view of the inverted cup.

Fig. 6 is a fragmentary central and vertical section through an embodiment of my invention allied to that of Fig. 1, but in which the floating cup is formed so that the indications are spaced progressively.

Fig. 7 is a fragmentary central and vertical section through an embodiment also allied to that of Fig. 1, with the cup constructed for use when subject to sudden variations in gas pressure.

Figs. 8 and 9 are central and vertical sections showing two forms of inverted cups allied to that of Fig. 1 but constructed to increase the buoyancy of the cups.

Fig. 10 is an elevation of an embodiment of my invention including means for additionally magnifying the indicating scale.

Fig. 11 is an elevation of the tapering floating cup of Fig. 6.

Illustrative of the fundamental manner in which my gauge is constructed and operated, Fig. 1 shows a glass bell B sealed at its lower end to a base plate P and having at its upper end a neck N to which a hose H is sealed. Seated on the base plate within this glass bell is an upwardly open receptacle R having a cylindrical riser wall, and partly filled with mercury M.

Housed also by the glass gell B is an inverted glass cup C which preferably has a cylindrical riser wall and a horizontal cup bottom, this cup being initially suspended from the neck of the said bell by a thread T at such an elevation (as shown in dotted lines at C') as to permit a free passage of air or other gas between the lower edge of the cup and the top of the mercury.

With the inverted cup thus freely spaced from the mercury and the glass bell B sealed to the base plate P, the hose H is first converted to a vacuum pump for exhausting the air within the bell (and hence also the air within the inverted cup) to a high degree. The thread T is then burned, desirably close to its connection to the cup, by means of a burning lens, thereby permitting the inverted cup to drop and float upon the mercury. According to the well known principle that a floating body displaces its own weight of liquid, this cup (when made of glass which has a much lower specific gravity than mercury) will then float with only a relatively short lower portion of its riser wall immersed in the mercury, as shown in Fig. 1. The mercury then readily finds its common level within and around the cup, and the space within the cup is at substantially the same degree of vacuum as that within the glass bell B exteriorly of the cup.

When air is then admitted gradually through the hose H into the glass bell B, the increased air pressure on the surface of the mercury outside the floating cup tends to depress this portion of the mercury and raises the level K of the mercury inside the cup; and since the downward pressure of the air on the cup-bottom C is not materially opposed by any pressure of the rarified air within the cup, this pressure depresses the cup. As the result of these combined actions, the cup sinks more and more into the mercury as the air pressure within the bell is increased, and gradually raises the level of the mercury within the cup to a relatively much smaller extent until the cup is entirely filled with mercury and only projects for a relatively short portion of its height above the level L of the mercury around the cup.

Any further increase of air pressure thereafter will not affect the height at which the inverted cup floats; and during all these variations in the elevation of this cup, the level of the mercury around it remains substantially constant, so that the pressure of the gas within the bell can be read from graduations G on the glass cup by sighting along the said level K through the riser wall of the glass receptacle R.

During the downward movement of the floating cup in response to an increase in pressure, the additional mercury displaced by the riser wall of the cup must equal that which is added to the height of the mercury within the cup. And since any thin walled cup has the cross-sectional area of its riser wall much smaller than the area of its bore, this causes the cup to move vertically at a much greater rate than that at which the level K of mercury within the cup rises.

For example, if the cross-sectional area of the cup wall W is one-tenth the area of the bore of the riser wall of the cup, the cup will rise or fall ten millimeters for every millimeter change in the level of mercury inside the cup. Consequently, by having the thickness of this riser wall a quite small fraction of the radius of the bore of this wall I can readily secure a large magnification of the changes in the level of the mercury within the cup.

In practice, such a glass cup can easily be made with an exteriorly cylindrical riser wall of substantially uniform thickness, so that the spacings of the graduations can readily be calculated in advance from the data as to the dimensions of the cup and the specific gravity of the glass used for it. Then the indications can be affixed after a comparison of the operation of the gauge with a standard vacuum gauge of the one of the more complex and more difficultly manipulated types.

With an inverted floating cup having an exteriorly cylindrical riser wall of uniform thickness, the spacings of the graduations for indicating uniform changes in pressure (or vacuum) will be equal, but for some special purposes it may be desirable to have the spacings of increased size at pressures approximating the desired one. In such cases, the cup exterior may be part of a conical surface, as shown by the cup D in Figs. 6 and 11, with the spacings of the graduations correspondingly decreasing progressively upward.

For commercial use and even for laboratory purposes, the sealing of a glass bell to a base would be undesirable and the volume of mercury required in a receptacle such as that of Fig. 1 would make the gauge too heavy to be portable, in addition to involving an undesirably large expense for the mercury. To overcome these objections, I preferably substitute for the glass bell and base of Fig. 1 a glass container having an exteriorly cylindrical riser wall 1 (Fig. 2) of much greater length than diameter and having its mouth end 2 formed for affording a hermetic seal to a nipple 3 to which a hose can be attached, which nipple carries a stop-cock 4.

Then I recurve the bottom of this container radially inward and upward to present a cylindrical tubular inner wall 5 closed at its top and of less height than the correspondingly elongated inverted glass cup 6 to be used in this container. I also desirably provide this cup 6 at both its upper and lower ends with projections 7 adapted to engage the inner face of the riser wall of the container to limit the tilting of the cup and to avoid having the riser wall of the cup directly engage that of the container. When thus constructed, as shown in Figs. 2 to 5 inclusive, both the diameter and the weight of the complete gauge are reduced greatly, so that this can be handled much more expeditiously.

Where extremely small variations in pressure are to be measured—as for example, those corresponding to a hundredth of a millimeter or less in a mercury barometer—I magnify the indication spacing still more after the manner shown in Fig. 10.

In this embodiment of my invention, the glass container 8 has its bottom bulged upward to afford an annular space housing the major portion of the mercury, in which space the lower portions of the riser wall of the inverted cup 10 can move freely. I also seal the upper end of the container 8 to the end of one shank 11 of a U-shaped glass tube of relatively smaller bore in proportion to the bore of the said container, the companion shank 13 of this U-tube having at its upper end an inlet 12 for connection by a hose to the gas which is to be measured as to its pressure.

In addition, I fill the part of the container above the mercury M and the cup 10, the entire shank 11 of the glass tube and part of the companion shank 13 with a liquid considerably lighter than mercury, as for example, butyl phthalate or a mineral oil. Thus arranged, variations in the pressure of the gas to which the inlet 12 is connected will exert a corresponding increase or decrease of pressure within the container 8 thereby raising or lowering the elevation at which the cup is disposed, and also raising or lowering the level 14 of the lighter liquid in the riser shank 13 of the U-tube.

With every such change in elevation of the floating cup, the height of the space S above the mercury in the cup (which space contains rarified air after the manner of the Torricellian vacuum in a mercury barometer) will vary, thereby correspondingly reducing the space left above the mercury M and the cup for the lighter oil.

This change in the space left for the lighter oil correspondingly varies the level 14 of that oil in the riser shank 13 of the U-tube, and with the bore of this U-tube much smaller than that of the cup 10, the changes indicated on graduations G adjacent to that riser enormously magnify the variations in the level of the floating cup, so that the extent of the vacuum or pressure can easily be read in graduations of a thousandth of a millimeter of pressure on a scale G associated with the said shank 13, on which scale the indications are read according to the height of the liquid in that shank.

Since my gauge, even when designed for indicating such minute variations in pressure (or vacuum) can easily be constructed by an experienced glass blower in a quite portable form, my gauge particularly lends itself both for exact and speedy laboratory work and for commercial purposes where such pressures need to be accurately and quickly determined, as for example in the manufacturing of neon signs.

However, while I have heretofore described my gauge in desirable embodiments in which almost all parts are constructed of glass and in which the inverted cup floats on mercury, I do not wish to be limited in these respects, nor to the details of the construction, arrangement and operation above disclosed, since many changes might obviously be made without departing either from the spirit of my invention or from the appended claims.

For example, other liquids might be substituted for the mercury; also, the floating cup might be made of other material than glass, provided that this material is not affected by the liquid on which it floats; and if this material is not transparent, the graduations on the cup can be calibrated so as to be read from the level L of the liquid outside the floating cup. However, with embodiments like those of Figs. 2, 3, 6 and 7, I preferably make the floating cup of a transparent material and graduate it so that the readings will be sighted along the level K of the liquid within the cup.

The proportions and other features of the floating cup may also be varied to meet particular requirements. For example, if such a cup is too heavy to float at the desired maximum elevation, it may effectively be lightened by forming its lower end to afford a peripheral annular air pocket 15 as shown in Fig. 9.

Where my gauge is to be subject to sudden pressure variations, such as might cause a violent lifting of the cup to bounce this against the upper portion of the container, I can guard against breakage by providing the cup also with a bottom 16 (as in Fig. 7) having a perforation 17 through which the mercury can only move up or down at so slow a rate as to check violent movements of the cup. A floating cup of this form can also be made more buoyant by providing its lower end with an interior annular air chamber 18 (as shown in Fig. 8), thereby still leaving a bottom bore 19 through which the mercury can only move slowly.

With the embodiments of Figs. 2, 3 and 10, the upward bulging of the central portion of the receptacle bottom does not affect the scale of the needed graduations, but merely reduces the quantity and weight of the liquid on which the inverted cup floats, thereby reducing the outlay for this liquid and permitting my gauge to be constructed in compact and readily portable forms such as those shown in their actual size by Figs. 3 and 10.

I claim as my invention:

1. A vacuum gauge comprising a receptacle containing liquid, an inverted cup floating in the liquid and having a Torricellian vacuum in the space within the cup above the liquid, the surface of the liquid outside the cup and the exterior part of the cup above the liquid being subject to the gas which is to be measured as to its pressure, and means for indicating the height at which the cup floats.

2. A vacuum gauge as per claim 1, in which the thickness of the riser wall of the receptacle is a minor fraction of the radius of the bore of that wall.

3. A vacuum gauge comprising a receptacle containing liquid, an inverted cup-like member floating in the liquid and having a Torricellian vacuum in the space within the cup above the liquid, the surface of the liquid outside the cup and exterior part of the cup above the liquid being subject to the gas which is to be measured as to its pressure, and vertically spaced graduations on the cup from which the pressure can be read, the receptacle having a transparent portion through which the graduations can be seen.

4. A vacuum gauge as per claim 3, in which the graduations are calibrated so as to be read from the level of liquid inside the floating cup.

5. A vacuum gauge as per claim 1, in which the exterior of the riser wall of the floating cup is an upright cylindrical surface.

6. A vacuum gauge as per claim 1, in which the bottom of the receptacle has its central portion bowed upward to cooperate with the lower part of the riser wall of the receptacle for constituting an annular trough freely housing the lower portion of the riser wall of the cup.

7. A vacuum gauge as per claim 1, in which the bottom of the receptacle has its central portion bowed upward to cooperate with the lower part of the riser wall of the receptacle for constituting an annular trough freely housing the lower portion of the riser wall of the cup; the height of the said bowed up receptacle bottom portion being less than the height of the cup.

8. A vacuum gauge as per claim 1, in which the cup is provided at its lower edge with spaced projections adapted to engage the riser wall of the receptacle so as to limit the tilting of the cup with respect to the receptacle.

9. A vacuum gauge as per claim 1, in which both the upper and the lower edges of the cup are provided with circumferentially spaced radial projections adapted to engage the riser wall of the receptacle so as to limit the tilting of the cup with respect to the receptacle.

10. A vacuum gauge comprising a receptacle, a heavy liquid partly filling the receptacle, an inverted cup floating on the liquid, an airtight housing associated with the receptacle and enclosing a space above the cup, there being a Torricellian vacuum within the cup above the liquid, inlet means associated with the upper portion of the housing for admitting gas the pressure of which is to be measured, and means for indicating the elevation of the cup with respect to the level of the liquid for indicating the pressure of gas in the said space.

11. A vacuum gauge as per claim 10, in which the housing is integral with the receptacle and is provided in its upper portion with a neck to which the inlet means are detachably connected.

12. A vacuum gauge comprising a receptacle having its lower portion of the shape of an annular trough with a cylindrically tubular outer riser wall, an inverted cup-shaped member having a tubular riser wall of less thickness than the radial width of the said trough, said member being disposed with its said wall partially housed by the trough; liquid filling the trough and extending within the receptacle above the top of the inner wall of the trough, on which liquid the said member floats; the said member having a Torricellian vacuum in it above the liquid; a tube connected to the receptacle above the level of the liquid and connected at its other end to the gas which is to be measured as to its pressure, the bore of the said tube being of relatively small diameter in proportion to the bore of the receptacle; a second liquid filling the part of the receptacle above the first named liquid and extending into the tube, the second liquid being of lower specific gravity than the first named liquid, and means for indicating the extent to which the liquid extends into the tube.

13. A vacuum gauge comprising a receptacle having its upper portion subject to the gas pressure which is to be measured, liquid partly filling the receptacle; a downwardly open hollow member buoyed up by the liquid and immersed for part of its height into the liquid and having a Torricellian vacuum in the interior of said member above the liquid; a tube connected at one end to an upper portion of the receptacle and subject at its other end to the gas which is to be measured as to its pressure, the bore of the tube being a minor fraction of that of the receptacle; a second liquid filling the part of the receptacle above the first named liquid and extending into the tube, the second liquid being of lower specific gravity than the first named liquid; and a graduated scale associated with the said tube and affording a reading of the distance to which the second liquid extends into the said tube.

14. A vacuum gauge comprising a receptacle, liquid partly filling the receptacle, an inverted cup floating on the liquid and having its riser wall extending partially into the liquid, a U-tube having one end thereof sealed to the receptacle at a higher elevation than the level of the liquid, and having its other end subject to the pressure which is to be measured; a second liquid, of less specific gravity than the aforesaid liquid, filling the part of the receptacle above the first named liquid and the connection of the receptacle to the first named shank of the U-tube and also filling that shank and part of the other shank, and means for indicating the level of the said second liquid in the last named shank of the U-tube.

JOHN DUBROVIN.